United States Patent
Fong et al.

(10) Patent No.: US 11,826,925 B2
(45) Date of Patent: Nov. 28, 2023

(54) THIOL-ENE INKS FOR 3D PRINTING

(71) Applicant: 3D Systems, Incorporated, Rock Hill, SC (US)

(72) Inventors: John Fong, Temple City, CA (US); Pingyong Xu, Valencia, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

(21) Appl. No.: 17/403,338

(22) Filed: Aug. 16, 2021

(65) Prior Publication Data
US 2021/0370548 A1 Dec. 2, 2021

Related U.S. Application Data

(63) Continuation of application No. 16/410,070, filed on May 13, 2019, now Pat. No. 11,090,835, which is a continuation of application No. 15/480,918, filed on Apr. 6, 2017, now Pat. No. 10,328,603.

(60) Provisional application No. 62/319,533, filed on Apr. 7, 2016.

(51) Int. Cl.

| | |
|---|---|
| *B28B 1/00* | (2006.01) |
| *C09D 11/10* | (2014.01) |
| *C09D 11/00* | (2014.01) |
| *C09D 11/101* | (2014.01) |
| *B33Y 70/00* | (2020.01) |
| *B33Y 10/00* | (2015.01) |
| *B33Y 30/00* | (2015.01) |
| *B33Y 50/02* | (2015.01) |
| *B29C 64/386* | (2017.01) |
| *B29C 64/00* | (2017.01) |
| *C09D 11/033* | (2014.01) |
| *C09D 11/30* | (2014.01) |
| *B29C 64/112* | (2017.01) |

(52) U.S. Cl.
CPC .............. *B28B 1/001* (2013.01); *B29C 64/00* (2017.08); *B29C 64/386* (2017.08); *B33Y 10/00* (2014.12); *B33Y 30/00* (2014.12); *B33Y 50/02* (2014.12); *B33Y 70/00* (2014.12); *C09D 11/00* (2013.01); *C09D 11/033* (2013.01); *C09D 11/101* (2013.01); *C09D 11/30* (2013.01); *B29C 64/112* (2017.08)

(58) Field of Classification Search
CPC ....... B28B 1/001; B29C 64/00; B29C 64/386; B29C 64/112; C09J 11/00; C09J 11/033; C09J 11/30; C09J 11/101; B33Y 70/00; B33Y 10/00; B33Y 50/00; B33Y 30/00
See application file for complete search history.

(56) References Cited

U.S. PATENT DOCUMENTS

| | | |
|---|---|---|
| 5,167,882 A | 12/1992 | Jacobine et al. |
| 7,521,015 B2 | 4/2009 | Cheng et al. |
| 8,481,241 B2 | 7/2013 | Napadensky et al. |
| 9,662,839 B2 | 5/2017 | Napadensky |
| 2009/0145314 A1 | 6/2009 | Botrie |
| 2014/0323647 A1 | 10/2014 | Voit et al. |
| 2016/0024331 A1 | 1/2016 | Catena |
| 2016/0311243 A1 | 10/2016 | Sakamoto |
| 2016/0369096 A1 | 12/2016 | Rolland et al. |
| 2017/0028618 A1 | 2/2017 | Robeson et al. |

FOREIGN PATENT DOCUMENTS

| | | |
|---|---|---|
| CN | 101228190 A | 7/2008 |
| EP | 1487676 | 1/2005 |
| JP | 1991-357625 | 5/1991 |
| JP | 1993-011449 | 1/1993 |
| WO | 2015093617 | 6/2015 |
| WO | 2015200173 | 12/2015 |

OTHER PUBLICATIONS

PCT International Search Report the International Searching Authority for PCT/US2017/026323, dated Jun. 9, 2017 (Sep. 6, 2017) (6 pages).
PCT Written Opinion of the International Searching Authority for PCT/US2017/026323, dated Jun. 9, 2017 (Sep. 6, 2017) (10 pages).
English translation of Japanese First Office Action for Japanese Application No. 2018-552055 dated Oct. 2, 2019 (6 pages).
English machine translation of Japanese Patent Publication No. H3 (1991)-JPH057625.
English translation of Chinese First Office Action for Chinese Application No. 201780035334.4 dated Feb. 1, 2021 (6 pages).
English translation of Chinese Second Office Action for Chinese Application No. 201780035334.4 dated Nov. 30, 2021 (6 pages).

*Primary Examiner* — Sanza L. McClendon
(74) *Attorney, Agent, or Firm* — Maynard Nexsen PC; John P. Zimmer

(57) ABSTRACT

In one aspect, inks for use with a three-dimensional printing system are described herein. In some embodiments, an ink described herein comprises a thiol monomer component and an ene monomer component. Moreover, in some cases, an ink described herein further comprises an additional (meth) acrylate monomer component differing from the ene monomer component. In some such cases, the additional (meth) acrylate monomer component can be polymerized separately from the thiol and ene monomers of the ink.

19 Claims, No Drawings

THIOL-ENE INKS FOR 3D PRINTING

CROSS REFERENCE TO RELATED APPLICATIONS

This application is a continuation of U.S. Non-Provisional patent application Ser. No. 16/410,070, filed May 13, 2019, which is a continuation of U.S. Non-Provisional patent application Ser. No. 15/480,918, filed Apr. 6, 2017; which claims priority pursuant to 35 U.S.C. § 119 to U.S. Provisional Patent Application No. 62/319,533, filed on Apr. 7, 2016; each of which is hereby incorporated by reference in its entirety.

FIELD

The present invention relates to inks and, in particular, to inks for use with three-dimensional (3D) printing systems.

BACKGROUND

Some commercially available 3D printers, such as the Projet™ 3D Printers manufactured by 3D Systems of Rock Hill, South Carolina, use inks, which are also known as build materials, that are jetted through a print head as a liquid to form various 3D objects, articles, or parts. Other 3D printing systems also use an ink that is jetted through a print head or otherwise dispensed onto a substrate. In some instances, the ink is solid at ambient temperatures and converts to liquid at elevated jetting temperatures. In other instances, the ink is liquid at ambient temperatures. Moreover, in some cases, the ink can be cured following dispensing and/or deposition of the ink onto the substrate.

Other 3D printers form 3D articles from a reservoir, vat, or container of a fluid ink or build material or a powdered ink or build material. In some cases, a binder material or a laser, digital light processing (DLP) source, or other source of energy is used to selectively solidify or consolidate layers of the ink or build material in a stepwise or layer-by-layer fashion to provide the 3D article.

Inks for 3D printing systems can be used to form a variety of articles for a variety of applications, including in a manner described hereinabove. However, some inks for 3D printing systems include (meth)acrylates as a primary curable material. Such inks may provide high printing resolution but may also provide printed 3D articles that are rigid and brittle or flexible but easily broken. Therefore, there exists a need for improved inks for 3D printing, including inks that can provide a combination of desirable properties, such as high printing resolution and high toughness.

SUMMARY

In one aspect, inks for use with a 3D printer are described herein which, in some embodiments, may offer one or more advantages over prior inks. In some embodiments, for example, an ink described herein can be used to form printed 3D articles having high toughness and high resolution, as well as other desirable mechanical properties.

In some embodiments, an ink for use in a 3D printing system described herein comprises a thiol monomer component and an ethylenically unsaturated monomer component. The thiol monomeric component can comprise one or more than one thiol-containing chemical species. Similarly, the ethylenically unsaturated monomer component can comprise one or more ethylenically unsaturated chemical species. The thiol monomer component and the ethylenically unsaturated monomer component can be chosen to react with one another in a so-called thiol-ene reaction. Thus, the ethylenically unsaturated monomer component of an ink described herein can also be referred to as an "ene" monomer component.

Moreover, in some cases, an ink described herein further comprises an additional (meth)acrylate monomer component differing from the ene monomer component. In some such instances, the additional (meth)acrylate monomer component can be polymerized separately from the thiol and ene monomers of the ink. For example, in some instances, the thiol and ene monomers of the ink can react with one another to form a first polymer network through a thiol-ene reaction, and the additional (meth)acrylate monomer of the ink can react with itself to form a second polymer network. In such cases, the first and second polymer networks can be separate or differing polymer networks. Additionally, in some embodiments, the first and second polymer networks together form an interpenetrating polymer network. Moreover, the first and second polymer networks can be formed through differing polymerization processes.

It is also possible, in some embodiments, for the additional (meth)acrylate monomer of the ink to react with itself and also with the ene monomer of the ink. In such an instance, only one polymer network may be formed. Additionally, in some embodiments, an ink comprises a thiol monomer and an ene monomer, and the ene monomer is present in a stoichiometric excess compared to the thiol monomer. In some such cases, the ene monomer may react with the thiol monomer to provide a first polymer network (specifically, a thiol-ene polymer network) and may further react with itself to provide a second polymer network (such as a separate poly(meth)acrylate network). Thus, in some such instances, interpenetrating polymer networks may be provided without the use of an additional (meth)acrylate monomer that differs from the ene monomer.

An ink described herein might be particularly useful for a 3D printing system, such as a contacting stereolithography (cSLA) printing system or other stereolithography (SLA) printing system, in which the thiol monomer, the ene monomer, and, optionally, the additional (meth)acrylate monomer are combined under conditions (e.g., time, temperature, and/or polymerization inhibitor conditions) that are not sufficient for substantial thiol-ene reaction between the thiol monomer and the ene monomer (or additional (meth)acrylate monomer) to occur prior to printing.

Alternatively, as described further hereinbelow, 3D printing may be carried out using a plurality of inks, wherein a first ink comprises a thiol monomer, and a second ink comprises an ene monomer. The second ink may also optionally include an additional (meth)acrylate monomer differing from the ene monomer. Such a dual ink system may be particularly useful for a 3D printing system, such as a multi-jet modeling (MJM) system, in which it may not be desirable to combine the thiol monomer with the ene monomer (or with the additional (meth)acrylate monomer) prior to printing. (However, it is to be understood that a "single" ink may also be used in an MJM system, provided that conditions disfavoring premature reaction of the ink components (such as conditions provided by a strong polymerization inhibitor) are present.) Thus, in another aspect, kits for use in a 3D printing system are described herein. In some embodiments, such a kit comprises a first ink comprising a thiol monomer component and a second ink comprising an ene monomer component.

It is to be understood that inks described herein, whether "single" inks or inks that are part of a kit, may further comprise one or more additional components in addition to monomers described hereinabove. For example, in some embodiments, an ink described herein further comprises one or more additives selected from the group consisting of colorants, inhibitors, stabilizing agents, photoinitiators, and photosensitizers.

In another aspect, uses of a composition for 3D printing are described herein, wherein the composition comprises an ink or kit described hereinabove. For instance, in some cases, a use of a composition for 3D printing is described herein, wherein the composition comprises a thiol monomer and an ene monomer.

In still another aspect, 3D printing systems are described herein. Such a 3D printing system can comprise a composition for 3D printing described hereinabove, such as a composition comprising an ink or kit described hereinabove. In some embodiments, a 3D printing system described herein comprises a 3D printer having at least one ink dispenser or ink reservoir, and a composition described herein disposed in the ink dispenser or the ink reservoir. The composition can comprise any ink described herein for use in 3D printing. For example, in some cases, a 3D printing system described herein comprises a 3D printer having at least one of an ink dispenser and an ink reservoir, and an ink disposed in the ink dispenser, the ink reservoir, or both, wherein the ink comprises a thiol monomer. Moreover, in some instances, such a 3D printer further comprises a second ink dispenser or reservoir and a second ink disposed in the second ink dispenser or reservoir, wherein the second ink comprises an ene monomer.

In another aspect, methods of printing a 3D article are described herein, wherein the method is carried out using one or more inks described herein. In some cases, such a method comprises selectively jetting or otherwise depositing layers of an ink in a fluid state onto a substrate, wherein the ink comprises a thiol monomer and an ene monomer component. Additionally, in some cases, the layers of the ink are deposited in a layer-by-layer manner according to an image of the 3D article in a computer readable format. Moreover, in some embodiments, a method described herein further comprises polymerizing or curing the thiol monomer and the ene monomer. Such curing may be carried out in a layer-by-layer manner during the printing process, or in a "post-processing" step, such as a curing step carried out after completion of printing of all layers of the article. Further, whenever in the process it occurs, such curing can comprise reacting the thiol monomer with the ene monomer to form a thiol-ene polymerization reaction product, which may also be referred to as a "poly(thiol-ene)" or as a "thiol-ene polymer or oligomer."

Moreover, in some instances, an ink used in a method described herein comprises an additional (meth)acrylate monomer that differs from the ene monomer that participates in thiol-ene polymerization. In such cases, the method can further comprise curing the additional (meth)acrylate monomer with electromagnetic radiation, such as ultraviolet (UV) light or visible light. Such curing can comprise polymerizing the ethylenically unsaturated moieties of the (meth)acrylate monomer to form a poly(meth)acrylate. Additionally, in some cases, as described further herein, the poly(meth)acrylate and the poly(thiol-ene) can together form an interpenetrating polymer network.

A method of printing a 3D article described herein can be carried out using a plurality of inks rather than one ink described herein. Such a method, in some cases, comprises selectively depositing layers of a first ink in a fluid state onto a substrate, and selectively depositing layers of a second ink in a fluid state onto the substrate, wherein the first ink and the second ink comprise a first ink and a second ink, respectively, of a kit described herein. In particular, the first ink can comprise a thiol monomer, and the second ink can comprise an ene monomer. In addition, in some embodiments, the first ink and/or the second ink further comprises an additional (meth)acrylate monomer that differs from the ene monomer of the second ink. In some such instances, the method further comprises photocuring the additional (meth)acrylate monomer, such as with UV light. Such curing can comprise polymerizing the ethylenically unsaturated moieties of the additional (meth)acrylate monomer to form a poly(meth)acrylate. A method described herein may further comprise curing the thiol monomer of the first ink and the ene monomer of the second ink, which may comprise reacting the thiol monomer with the ene monomer to form a poly(thiol-ene). A poly(meth)acrylate and poly(thiol-ene) formed from a plurality of inks in this manner can together form an interpenetrating polymer network.

Further, in still other embodiments, a method of printing a 3D article described herein does not necessarily comprise jetting or otherwise depositing one or more inks described herein onto a substrate according to digital data representing the 3D article. Instead, in some cases, a method of printing a 3D article described herein comprises retaining an ink in a fluid state in a container, and selectively applying energy to the ink in the container to solidify at least a portion of a first fluid layer of the ink, thereby forming a first solidified layer that defines a first cross-section of the article. The ink can comprise any ink described hereinabove. Moreover, such a method can further comprise raising or lowering the first solidified layer to provide a second fluid layer of the ink at a surface of the fluid ink in the container, and selectively applying energy to the ink in the container to solidify at least a portion of the second fluid layer of the ink, thereby forming a second solidified layer that defines a second cross-section of the article. The first cross-section and the second cross-section are bonded to one another in a z-direction.

In another aspect, printed 3D articles are described herein. Such articles can be formed from one or more inks and/or using one or more methods described hereinabove.

These and other embodiments are described in greater detail in the detailed description which follows.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by stereolithography, selective deposition, jetting, fused deposition modeling, multi-jet modeling, and other additive manufacturing techniques now known in the art or that may be known in the future that use a build material or ink to fabricate three-dimensional objects.

I. Inks and Kits for 3D Printing

In one aspect, inks for use with a 3D printer are described herein. In some embodiments, an ink described herein comprises a thiol monomer and an ene monomer. Further, in some instances, an ink described herein also comprises an additional (meth)acrylate monomer that differs from the ene monomer. Moreover, an ink described herein, in some cases, further comprises a colorant, such as a molecular dye, a particulate inorganic pigment, or a particulate organic colorant. An ink described herein may also comprise one or more additives selected from the group consisting of inhibitors, stabilizing agents, photoinitiators, and photosensitizers.

Turning now in detail to specific components of inks, an ink described herein comprises a thiol monomer. It is to be understood that a thiol "monomer," for reference purposes herein, is not limited to a specific molecular weight or to a specific chemical structure. Instead, a thiol "monomer" can be any thiol-containing chemical species that can react with an ethylenically unsaturated chemical species in a thiol-ene reaction, such as a thiol-ene polymerization reaction, in which a thiol (S—H) moiety is added across a carbon-carbon double bond of an ene to form a new carbon-sulfur covalent bond and a new carbon-hydrogen covalent bond. Moreover, a thiol "monomer" can comprise a plurality of thiol moieties. For example, in some instances, a thiol monomer comprises two, three, or four thiol moieties.

Any thiol monomer not inconsistent with the objectives of the present disclosure may be used in an ink described herein. For instance, in some embodiments, a thiol monomer comprises an alkyl thiol, a thiol glycolate ester, or a thiol propionate ester. Moreover, in some instances, such an alkyl thiol, thiol glycolate ester, or thiol propionate ester comprises a plurality of thiol moieties, including at differing terminuses of the monomer.

In some cases, a thiol monomer comprises a chemical species having the structure of Formula (A1), (A2), (A3), (A4), or (A5):

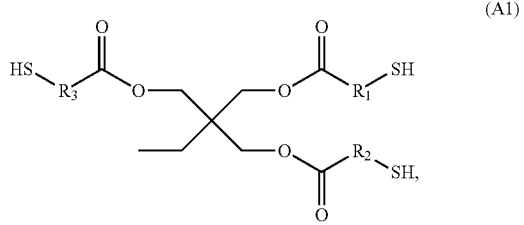
(A1)

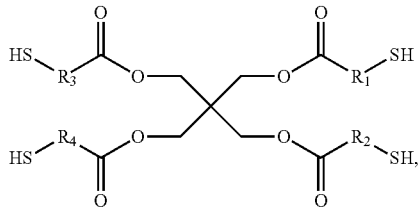
(A2)

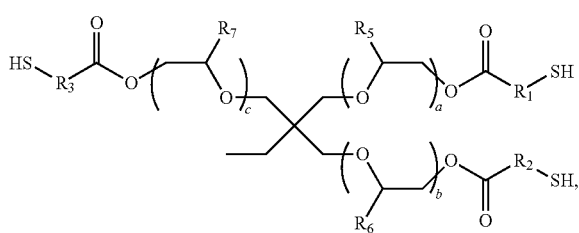
(A3)

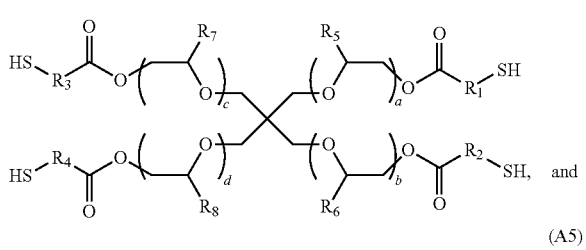
(A4)

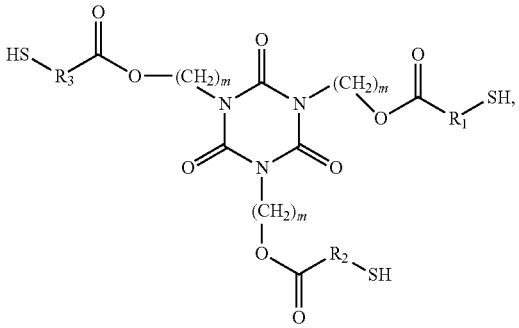
(A5)

wherein $R_1$, $R_2$, $R_3$, and $R_4$ are each independently a linear or branched C1-C36 alkyl or alkylene, alkenyl or alkenylene, aryl or arylene, or heteroaryl or heteroarylene moiety; $R_5$, $R_6$, $R_7$, and $R_8$ are each independently H or $CH_3$; a, b, c, and d are each independently an integer from 1 to 100; and m is an integer from 1 to 36. For example, in some cases, one or more of $R_1$, $R_2$, $R_3$, and $R_4$ is $CH_2$ or $CH_2CH_2$; and $R_5$, $R_6$, $R_7$, and $R_8$ are each H.

Non-limiting examples of thiol monomers suitable for use in some embodiments described herein include pentaerythritol tetra(3-mercaptopropionate) (PETMP) (commercially available from BRUNO BROCK under the trade name THIOCURE PETMP, PETMP l.o., or PETMP sl), trimethylol-propane tri(3-mercaptopropionate) (TMPMP) (commercially available from BRUNO BOCK), glycol di(3-mercaptopropionate) (GDMP) (commercially available from BRUNO BOCK), pentaerythritol tetramercaptoacetate (PETMA) (commercially available from BRUNO BOCK), trimethylol-propane trimercaptoacetate (TMPMA) (commercially available from BRUNO BOCK), glycol dimercaptoacetate (GDMA) (commercially available from BRUNO BOCK), ethoxylated trimethylolpropane tri(3-mercaptopropionate) (ETTMP) (commercially available from BRUNO BOCK under the trade name ETTMP 700 or ETTMP 1300, depending on molecular weight), propyleneglycol 3-mercaptopropionate (PPGMP) (commercially available from BRUNO BOCK under the trade name PPGMP 800 or PPGMP 2200, depending on molecular weight), tris[2-(3-mercaptopropionyloxy)ethyl]isocyanurate (TEMPIC) (commercially available from BRUNO BOCK), polycaprolactone tetra 3-mercaptopropionate (commercially available from BRUNO BOCK under the trade name PCL4MP 1350), 2,3-di((2-mercaptoethyl)thio)-1-propane-thiol (DMPT) (commercially available from BRUNO BOCK), dimercaptodiethylsulfide (DMDS) (commercially available from BRUNO BOCK), pentaerythritol tetrakis(3-mercaptobutylate) (commercially available from SHOWA DENKO under the trade name KARENZ MT PEI), 1,4-bis(3-mercaptobutylyloxy) butane (commercially available from SHOWA DENKO under the trade name KARENZ MT BD1), and 1,3,5-tris(3-mercaptobutyloxethyl)-1,3,5-triazine-2,4,6(1H, 3H,5H)-trione (commercially available from SHOWA DENKO under the trade name KARENZ MT NR1). Other thiol monomers may also be used in an ink described herein.

In some embodiments, the thiol monomer comprises a secondary thiol monomer. It is further to be understood that a thiol monomer component of an ink described herein can comprise only one chemical species or a plurality of differing chemical species. For example, in some cases, the thiol monomer of an ink described herein comprises a plurality of differing thiol-containing species. Any combination of differing thiol-containing species not inconsistent with the objectives of the present disclosure may be used in an ink described herein.

Moreover, the thiol monomer component, in total, can be present in an ink in any amount not inconsistent with the objectives of the present disclosure. For example, in some cases, an ink described herein comprises up to 50 wt. %, up to 40 wt. %, up to 30 wt. %, up to 25 wt. %, or up to 20 wt. thiol monomer, based on the total weight of the ink. In some instances, an ink comprises 5-50 wt. %, 5-40 wt. %, 10-50 wt. %, 10-40 wt. %, 10-30 wt. %, 10-20 wt. %, 15-50 wt. %, 15-40 wt. %, 15-30 wt. %, or 15-25 wt. % thiol monomer, based on the total weight of the ink.

Inks described herein also comprise an ene monomer. It is to be understood that an ene "monomer" is not limited to a specific molecular weight or chemical structure. Instead, an ene "monomer" can comprise any chemical species comprising one or more ethylenically unsaturated moieties that can react with a thiol monomer in a thiol-ene reaction to form a sulfur-carbon covalent bond.

Any ene monomer not inconsistent with the objectives of the present disclosure may be used in an ink described herein. In some cases, an ene monomer comprises a vinyl moiety, allyl moiety, propenyl moiety, and/or (meth)acrylate moiety, where the term "(meth)acrylate" includes acrylate or methacrylate or a mixture or combination thereof. Further, an ene monomer described herein can be a monofunctional, difunctional, trifunctional, tetrafunctional, pentafunctional, or higher functional monomer. A "monofunctional" monomer, for reference purposes herein, comprises a chemical species that includes one ethylenically unsaturated moiety. Similarly, a "difunctional" monomer comprises a chemical species that includes two ethylenically unsaturated moieties; a "trifunctional" monomer comprises a chemical species that includes three ethylenically unsaturated moieties; a "tetrafunctional" monomer comprises a chemical species that includes four ethylenically unsaturated moieties; and a "pentafunctional" monomer comprises a chemical species that includes five ethylenically unsaturated. Thus, in some embodiments, a monofunctional ene monomer of an ink described herein comprises a mono(meth)acrylate, a difunctional ene monomer of an ink described herein comprises a di(meth)acrylate, a trifunctional ene monomer of an ink described herein comprises a tri(meth)acrylate, a tetrafunctional ene monomer of an ink described herein comprises a tetra(meth)acrylate, and a pentafunctional ene monomer of an ink described herein comprises a penta(meth)acrylate. Other monofunctional, difunctional, trifunctional, tetrafunctional, and pentafunctional ene monomers may also be used. In some cases, difunctional or higher functional ene monomers are especially preferred.

Moreover, a monofunctional, difunctional, trifunctional, tetrafunctional, and pentafunctional monomer, in some cases, can comprise a relatively low molecular weight species or a relatively high molecular weight species. For example, a monomer can comprise or be either a "monomeric" or molecular species (i.e., a species that is itself not a polymer or oligomer, that is a relatively low molecular weight species, or that is a relatively low viscosity species), or an "oligomeric" species (i.e., a species that is itself a polymer or oligomer, that is a relatively high molecular weight species, or that is a relatively high viscosity species) that is capable of undergoing additional polymerization, such as through one or more points of unsaturation described herein. Thus, in some cases, a population of "monomeric" or molecular species in a monomer can have a consistent or well-defined molecular structure and/or formula throughout the population (such as may be exhibited, for instance, by a specified mass of ethoxylated (4) bisphenol A diacrylate). In contrast, a population of "oligomeric" species in a monomer can have a varying molecular structure and/or formula throughout the population (such as may be exhibited, for example, by a specified mass of a urethane acrylate having a non-unity molecular weight distribution, or by a specified mass of an ethoxylated polyethylene glycol having a distribution of ethylene glycol units and/or a distribution of ethoxy units within the population). Further, the weight average molecular weight of an "oligomeric" monomer can generally be in the range from about 400 to 10,000, from about 600 to 10,000, or from about 500 to 7,000. The molecular weight of a "monomeric" monomer, in contrast, can generally be below 600, below 500, below 400, below 300, below 200, or below 100. Additionally, in some embodiments, a "monomeric" monomer has a viscosity of 500 centipoise (cP) or less at 25° C., when measured according to ASTM D2983, while an "oligomeric" monomer has a viscosity of 1000 cP or more at 25° C., when measured according to ASTM D2983.

In general, any monomeric ene monomer not inconsistent with the objectives of the present disclosure may be used in an ink described herein. In some cases, the ene monomer comprises one or more species of (meth)acrylates, such as one or more monofunctional, difunctional, trifunctional, tetrafunctional (meth)acrylates, and/or pentafunctional (meth)acrylates. In some embodiments, for instance, a monomeric ene monomer comprises methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth)acrylate, tetrahydrofurfuryl methacrylate, isobornyl (meth)acrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or a combination thereof. In some embodiments, a monomeric ene monomer comprises one or more of allyl acrylate, allyl methacrylate, triethylene glycol di(meth)acrylate, tricyclodecane dimethanol diacrylate, and cyclohexane dimethanol diacrylate. Additionally, in some cases, a monomeric ene monomer comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, tripropylene glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, or bisphenol S. An ene monomer described herein may also comprise 1,1-trimethylolpropane tri(meth)acrylate, pentaerythritol monohydroxy tri(meth)acrylate, dipentaerythritol monohydroxy penta(meth)acrylate, and/or bis(trimethylolpropane) tetra(meth)acrylate. Further, in some cases, an ene monomer can comprise an ethoxylated or propoxylated species, such as ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1, 1-trimethylolpropanetri(meth)acrylate, or ethoxylated or propoxylated glycerol tri(meth)acrylate.

Additional non-limiting examples of commercially available monomeric ene monomers useful in some embodiments described herein include the following: isobornyl acrylate (IBOA), commercially available from SARTOMER under the trade name SR 506; isobornyl methacrylate, commercially available from SARTOMER under the trade name SR 423A; triethylene glycol diacrylate, commercially available from SARTOMER under the trade name SR 272; triethylene glycol dimethacrylate, commercially available from SARTOMER under the trade name SR 205; tricyclodecane dimethanol diacrylate, commercially available from SARTOMER under the trade name SR 833S; tris(2-hydroxy ethyl)isocyanurate triacrylate, commercially available from SARTOMER under the trade name SR 368; 2-phenoxyethyl acrylate, commercially available from SARTOMER under the trade name SR 339; ethyoxylated (3 mole) bisphenol A diacrylate, commercially available from SARTOMER under the trade name SR 349; and dipentaerythritol pentaacrylate, commercially available from SARTOMER under the trade name SR 399 LV. Other commercially available monomeric ene monomers may also be used.

In addition, any oligomeric ene monomer not inconsistent with the objectives of the present disclosure may be used in an ink described herein. In some cases, for instance, the ene monomer comprises a polyester (meth)acrylate oligomer, a urethane (meth)acrylate oligomer, or an epoxy(meth)acrylate oligomer. Further, in some embodiments, an oligomeric ene monomer described herein comprises an aliphatic polyester urethane acrylate oligomer and/or an acrylate amine oligomeric resin, such as EBECRYL 7100. In some cases, an oligomeric ene monomer described herein comprises a polypropylene glycol mono(meth)acrylate or polyethylene glycol mono(meth)acrylate. In some embodiments, an oligomeric ene monomer comprises a monofunctional aliphatic urethane (meth)acrylate. Moreover, in some cases, an oligomeric ene monomer comprises a diacrylate and/or dimethacrylate ester of an aliphatic, cycloaliphatic or aromatic diol, including polyethylene glycol, ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate.

Some non-limiting examples of commercially available oligomeric ene monomers useful in some embodiments described herein include the following: alkoxylated tetrahydrofurfuryl acrylate, commercially available from SARTOMER under the trade name SR 611; monofunctional urethane acrylate, commercially available from RAHN USA under the trade name GENOMER 1122; and aliphatic urethane diacrylate, commercially available from ALLNEX under the trade name EBECRYL 8402. Other commercially available oligomeric ene monomers may also be used.

Urethane (meth)acrylates suitable for use in inks described herein, in some cases, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers, in some cases, can be from about 400 to 10,000 or from about 500 to 7,000. Urethane (meth)acrylates are also commercially available from SARTOMER under the product names CN980, CN981, CN975 and CN2901, or from BOMAR Specialties Co. under the product name BR-741. In some embodiments described herein, a urethane (meth)acrylate oligomer has a viscosity ranging from about 140,000 centipoise (cP) to about 160,000 cP at about 50° C. or from about 125,000 cP to about 175,000 cP at about 50° C. when measured in a manner consistent with ASTM D2983. In some cases, a urethane (meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

It is to be understood that the ene monomer of an ink described herein can comprise only one chemical species or a plurality of differing chemical species. For example, in some cases, the ene monomer of an ink described herein comprises a plurality of differing ethylenically unsaturated species, such as one or more differing monomeric (meth)acrylates and/or one or more differing oligomeric (meth)acrylates. It is further to be understood that, when both an oligomeric species and a monomeric species are included in an ene monomer of an ink described herein, the ratio of oligomeric species to monomeric species in the ink can be selected to provide an ink having a viscosity suitable for use in a desired 3D printing system, such as a 3D printing system using a piezoelectric print head to dispense inks, or a stereolithography 3D printing system.

Many of the foregoing examples of ene monomers described herein are (meth)acrylates. In some embodiments, the use of such (meth)acrylates may be advantageous for some 3D printing applications. However, it is also possible for the ene monomer to be or comprise a chemical species other than a (meth)acrylate. Moreover, in some embodiments, the ene monomer of an ink described excludes (meth)acrylates or is substantially free of (meth)acrylates. An ene monomer that is "substantially" free of (meth)acrylates, for reference purposes herein, can include less than 10 wt. %, less than 5 wt. %, less than 3 wt. %, or less than 1 wt. % (meth)acrylates, based on the total weight of the ene monomer.

In some embodiments, an ene monomer comprises a substituted or unsubstituted norbornene, vinyl ether, alkene, vinyl ester, N-vinyl amide, allyl ether, allyl triazine, allyl isocyanurate, maleimide (such as an N-substituted maleimide), acrylonitrile, styrene, conjugated diene, or a combination thereof. Other non-(meth)acrylate ene monomers may also be used.

An ene monomer can be present in an ink described herein in any amount not inconsistent with the objectives of the present disclosure. In some cases, the ene monomer, in total, is present in an amount up to about 90 wt. %, up to about 80 wt. %, up to about 70 wt. %, up to about 60 wt. %, up to about 50 wt. %, up to about 40 wt. %, up to about 30 wt. %, or up to about 20 wt. %, based on the total weight of the ink. In some cases, an ink described herein comprises about 10-90 wt. %, 10-80 wt. %, 10-70 wt. %, 20-90 wt. %, 20-85 wt. %, 20-75 wt. %, 20-70 wt. %, 20-60 wt. %, 20-50 wt. %, 30-80 wt. %, 30-70 wt. %, 40-80 wt. %, 40-70 wt. %, 50-90 wt. %, 50-80 wt. %, or 50-70 wt. % ene monomer, based on the total weight of the ink.

Inks described herein, in some embodiments, also comprise an additional (meth)acrylate monomer component differing from the ene monomer component of the ink. It may be particularly desirable to use such an additional (meth)acrylate monomer in embodiments in which the ene monomer is free or substantially free of (meth)acrylates. As described above, in some such cases, the additional (meth)acrylate monomer can be polymerized or cured separately from the thiol and ene monomers of the ink. For example, in some instances, the thiol and ethylenically unsaturated monomers of the ink can react with one another to form a first polymer network through a thiol-ene polymerization reaction, and the additional (meth)acrylate monomers of the ink can react with one another to form a second polymer network. In such cases, the first and second polymer networks can be separate or differing polymer networks formed by separate or differing polymerization processes. Additionally, in some embodiments, the first and second polymer networks can together form an interpenetrating polymer network.

The use of two differing polymerization processes (such as a thiol-ene polymerization process and a separate (meth)acrylate polymerization process) can permit a printed 3D article formed from a thiol monomer, an ene monomer, and an additional (meth)acrylate monomer described herein to be cured in stages, rather than being cured in a unitary fashion. Moreover, differing stages of curing can be temporally separated from one another and/or spatially separated from one another within the geometry of the 3D article. For example, in some embodiments, a first monomer (or pair of monomers, such as a pair of thiol and ene monomers) can be cured during printing of the 3D article to provide a printed article having sufficient green strength to be handled and/or to exhibit a desired feature resolution, and a second monomer (or pair of monomers) can be cured following printing, such as by placing the article in an oven for thermal curing of the second monomer ("printing" in this context is to be understood to include the process of forming the printed article by providing successive layers or cross-sections of the article, and to exclude any "post-printing" or "post-processing" steps such as infiltration of the printed article with an infiltrant or heating of the printed article). In other cases, the first monomer (or pair of monomers) cures or polymerizes within a first region of the printed 3D article, and the second monomer (or pair of monomers) cures or polymerizes within a second region of the printed 3D article, wherein the first and second regions are different regions.

Additionally, dual polymerization or curing may also be provided, including in a temporally or spatially segregated manner, without the use of an additional (meth)acrylate monomer that differs from the ene monomer. For instance, in some embodiments, an ink comprises a thiol monomer and an ene monomer, and the ene monomer is present in a stoichiometric excess compared to the thiol monomer. In some such cases, the ene monomer may react with the thiol monomer to provide a first polymer network (specifically, a thiol-ene polymer network) and may further react with itself to provide a second polymer network (such as a separate poly(meth)acrylate network).

Any additional (meth)acrylate monomer not inconsistent with the objectives of the present disclosure may be used in an ink described herein. In general, any (meth)acrylate species or combination of (meth)acrylate species described hereinabove in the context of the ene monomer may also be used as the additional (meth)acrylate monomer of an ink described herein. It is further to be understood that the additional (meth)acrylate monomer of an ink described herein can comprise only one (meth)acrylate species or a plurality of differing (meth)acrylate species. For example, in some embodiments, the additional (meth)acrylate monomer of an ink described herein comprises a monomeric (meth)acrylate described hereinabove and an oligomeric (meth)acrylate described hereinabove.

An additional (meth)acrylate monomer can be present in an ink described herein in any amount not inconsistent with the objectives of the present disclosure. In some cases, the additional (meth)acrylate monomer, in total, is present in an amount up to about 80 wt. %, up to about 70 wt. %, up to about 60 wt. %, up to about 50 wt. %, up to about 40 wt. %, up to about 30 wt. %, up to about 20 wt. %, or up to about 10 wt. %, based on the total weight of the ink. In some cases, an ink described herein comprises about 5-80 wt. %, 10-70 wt. %, 10-60 wt. %, 15-80 wt. %, 20-75 wt. %, 20-65 wt. %, 20-50 wt. %, 20-40 wt. %, 30-70 wt. %, 30-60 wt. %, 40-70 wt. %, 40-60 wt. %, 50-80 wt. %, or 50-70 wt. % additional (meth)acrylate monomer, based on the total weight of the ink.

Inks described herein can further comprise one or more components in addition to the monomers described hereinabove. For instance, an ink described herein can further comprise a colorant, such as a molecular dye, a particulate inorganic pigment, or a particulate organic colorant. An ink described herein may also comprise one or more additives selected from the group consisting of inhibitors and stabilizing agents. Further, an ink described herein can include one or more photoinitiators and/or one or more photosensitizers.

An ink can comprise any colorant not inconsistent with the objectives of the present disclosure. The colorant of an ink described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of an ink comprises an inorganic pigment, such as $TiO_2$ and/or ZnO. In some embodiments, the colorant of an ink comprises a colorant for use in a RGB, sRGB, CMY, CMYK, L*a*b*, or Pantone® colorization scheme. In some instances, one or more colorants of an ink described herein exhibits a white color. In other cases, a colorant exhibits a black color. Some non-limiting examples of colorants suitable for use in some embodiments described herein include SUN UVDJ107, SUN UVDJ150, SUN UVDJ322, SUN UVDJ350, SUN UVDJ354, RJA D3010-FX-Y150, RJA D3410-FX-Y150, RJA D3410-FX-K, PENN COLOR 9B898, and PENN COLOR 9B989. Moreover, in some cases, a particulate colorant described herein has an average particle size of less than about 5 µm, or less than about 1 µm. In some instances, a particulate colorant described herein has an average particle size of less than about 500 nm, such as an average particle size of less than about 400 nm, less than about 300 nm, less than about 250 nm, less than about 200 nm, or less than about 150 nm. In some instances, a particulate colorant has an average particle size of about 50-5000 nm, about 50-1000 nm, or about 50-500 nm.

A colorant can be present in an ink described herein in any amount not inconsistent with the objectives of the present disclosure. In some cases, colorant is present in the ink in an amount up to about 2 wt. %, or an amount of about 0.005-2 wt. %, 0.01-2 wt. %, 0.01-1.5 wt. %, 0.01-1 wt. %, 0.01-0.5 wt. %, 0.1-2 wt. %, 0.1-1 wt. %, 0.1-0.5 wt. %, or 0.5-1.5 wt. %, based on the total weight of the ink.

Moreover, inks described herein, in some embodiments, further comprise one or more polymerization inhibitors and/or stabilizing agents. A polymerization inhibitor can be added to an ink to provide additional thermal stability to the composition. Any polymerization inhibitor not inconsistent with the objectives of the present disclosure may be used. Moreover, a polymerization inhibitor can retard or decrease the rate of polymerization, and/or prevent polymerization from occurring for some period of time or "induction time" until the polymerization inhibitor is consumed. Further, in some cases, a polymerization inhibitor described herein is an "addition type" inhibitor. An inhibitor described herein can also be a "chain transfer type" inhibitor. In some instances, a suitable polymerization inhibitor comprises methoxyhydroquinone (MEHQ).

A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein. More generally, a single species may serve as both a stabilizing agent and a polymerization inhibitor. It is also possible, in some cases, to use a plurality of inhibitors and/or stabilizing agents, wherein differing inhibitors and/or stabilizers provide differing effects and/or work synergistically.

A polymerization inhibitor and/or a stabilizing agent can be present in an ink in any amount not inconsistent with the objectives of the present disclosure. In some embodiments, a polymerization inhibitor is present in an amount ranging from about 0.01 wt. % to about 2 wt. % or from about 0.05 wt. % to about 1 wt. %. Similarly, in some cases, a stabilizing agent is present in an ink in an amount ranging from about 0.1 wt. % to about 5 wt. %, from about 0.5 wt. % to about 4 wt. %, from about 0.5 wt. % to about 1.5 wt. %, or from about 1 wt. % to about 3 wt. %, based on the total weight of the ink.

An ink described herein may also comprise one or more photoinitiators. Any photoinitiator not inconsistent with the objectives of the present disclosure may be used. In some cases, a photoinitiator comprises an alpha-cleavage type (unimolecular decomposition process) photoinitiator or a hydrogen abstraction photosensitizer-tertiary amine synergist, operable to absorb light between about 250 nm and about 400 nm or between about 300 nm and about 385 nm, to yield free radical(s). Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, such as 2,4,6-trimethylbenzoyldiphenylphosphine oxide (Lucirin TPO), benzophenones, such as benzophenone and 4,4'-bis(N,N'-dimethylamino) benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Photoinitiators can also comprise photoinitiators operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, photoinitiators comprise photoinitiators operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of photoinitiator that may be included in an ink described herein comprises ionic dye-counter ion compounds capable of absorbing actinic radiation and generating free radicals for polymerization initiation. Some ionic dye-counter ion compounds and their mode of operation are disclosed in EP-A-0 223 587 and U.S. Pat. Nos. 4,751,102; 4,772,530; and 4,772,541.

A photoinitiator can be present in an ink described herein in any amount not inconsistent with the objectives of the present disclosure. In some embodiments, a photoinitiator is present in an ink in an amount of up to about 5 wt. %, based on the total weight of the ink. In some cases, a photoinitiator is present in an amount ranging from about 0.1 wt. % to about 5 wt. %.

Additionally, in some embodiments, an ink described herein further comprises one or more photosensitizers. In general, such a sensitizer can be added to an ink to increase the effectiveness of one or more photoinitiators that may also be present. In some cases, a sensitizer comprises isopropylthioxanthone (ITX) or 2-chlorothioxanthone (CTX).

A sensitizer can be present in an ink in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the ink.

Some non-limiting examples of inks according to the present disclosure are provided in Table I and Table II below. Specifically, Table I and Table II each provide weight percents for various components of exemplary inks, where the weight percents are based on the total weight of the ink. In Table I, the heading "Thiol" refers to thiol monomer, "Ene" refers to ene monomer, "AMM" refers to additional (meth)acrylate monomer, "PI" refers to photoinitiator, "Stab." refers to stabilizing agent, and "Colorant" refers to colorant. In Table II, "Mono." refers to monomeric (meth) acrylate, and "Olig." refers to oligomeric (meth)acrylate.

TABLE I

Ink Components.

| Ink | Thiol | Ene | AMM | PI | Stab. | Colorant |
|---|---|---|---|---|---|---|
| 1 | 5-40 | 5-40 | 15-60 | 0.5-2.5 | 0.2-2 | 0-2 |
| 2 | 5-30 | 5-30 | 35-60 | 1-2 | 0.2-1.5 | 0-2 |
| 3 | 5-20 | 5-20 | 55-70 | 0.5-3 | 0.2-1 | 0.1-1 |
| 4 | 10-40 | 10-40 | 15-70 | 1-5 | 0.5-2.5 | 0.1-0.5 |
| 5 | 10-30 | 10-30 | 35-70 | 0.1-3 | 0.5-5 | 0.1-1.5 |
| 6 | 15-25 | 15-25 | 45-70 | 0.1-2 | 1-5 | 0.005-2 |

TABLE II

Ink Components.

| Ink | Thiol | Mono. | Olig. | PI | Stab. | Colorant |
|---|---|---|---|---|---|---|
| 7 | 5-40 | 10-60 | 5-60 | 0.5-2.5 | 0.2-2 | 0.01-2 |
| 8 | 5-40 | 10-50 | 10-50 | 1-4 | 0.1-1 | 0-2 |
| 9 | 15-25 | 20-50 | 10-50 | 0.5-3 | 0.2-1 | 0.1-1 |
| 10 | 15-25 | 20-50 | 10-50 | 1-5 | 0.5-2.5 | 0.1-0.5 |

As described hereinabove, 3D printing may be carried out according to the present disclosure using a single ink capable of forming a polymer or oligomer from a thiol monomer, an ene monomer, and, optionally, an additional (meth)acrylate monomer. However, it is also possible to carry out 3D printing using a combination of differing inks that, when combined, are capable of forming a polymer or oligomer from a thiol monomer, an ene monomer, and, optionally, an additional (meth)acrylate monomer. Thus, in another aspect, kits for use in a 3D printing system are described herein. In some embodiments, such a kit comprises a first ink comprising a thiol monomer and a second ink comprising an ene monomer. Moreover, in some cases, the first ink and/or the second ink further comprises an additional (meth)acrylate monomer. The first ink and/or the second ink may also comprise a photoinitiator, inhibitor, stabilizing agent, and/or colorant.

Further, it is to be understood that the thiol monomer, ene monomer, additional (meth)acrylate monomer, photoinitiator, inhibitor, stabilizing agent, and colorant of a kit described herein can comprise any thiol monomer, ene monomer, additional (meth)acrylate monomer, photoinitiator, inhibitor, stabilizing agent, and colorant described herein for a "single" ink. Additionally, it is further to be understood that the first or second ink of a kit described herein can include a plurality or mixture of thiol species, a plurality or mixture of ethylenically unsaturated species, a plurality or mixture of additional (meth)acrylate species, a plurality or mixture of photoinitiators, a plurality or mixture of inhibitors, a plurality or mixture of stabilizing agents, and/or a plurality or mixture of colorants. In general, any combination or mixture of differing thiol species, ethylenically unsaturated species, additional (meth)acrylate species, photoinitiators, inhibitors, stabilizing agents, and/or colorants described herein may be used in a first ink and/or a second ink of a kit described herein. However, in some cases, an ink of a kit described herein does not comprise both a thiol species and also an ethylenically unsaturated species such as a (meth)acrylate.

Moreover, the inks of a kit described herein may be used simultaneously or sequentially in a 3D printing process. Additionally, in some cases, the inks of the kit can together provide differing monomers or curable materials that form differing polymer networks. In some such instances, the differing monomers and/or polymer networks of the differing inks of a kit can be cured in a temporally separated manner and/or a spatially separated manner within the geometry of the 3D article, as described above for single inks. For example, in some embodiments, a monomer (or pair of monomers) of the first (and/or second) ink can be cured during printing of the 3D article to provide a printed article having sufficient green strength to be handled and/or to exhibit a desired feature resolution, and a different monomer (or pair of monomers) of the second (and/or first) ink can be cured following printing, such as by placing the article in an oven for thermal curing of the second monomer. Similarly, in other cases, a monomer (or pair of monomers) of the first ink cures or polymerizes within a first region of the printed 3D article, and a monomer (or pair of monomers) of the second ink cures or polymerizes within a second region of the printed 3D article.

In addition, the two inks of a kit described herein can be used in separate ink dispensers or "channels" of a 3D printing system during 3D printing, or may be combined to form a single composition for forming a 3D article, as described further hereinbelow. Further, it is to be understood that a "channel" of a 3D printing system can refer to a mechanism for depositing a single material from an ink dispenser such as a print head. For example, a channel of a print head can refer to a specific material ejection orifice of a print head, alone or in combination with any material conduits, material storage compartments, and/or other hardware or software of a 3D printing system associated with the specific material ejection orifice. A channel can also refer to an entire print head dedicated to printing a single, specific material, alone or in combination with any material conduits, material storage compartments, and/or other hardware or software of a 3D printing system associated with printing the single, specific material from the channel.

Inks described herein, whether "single" inks or part of a kit, can exhibit a variety of desirable properties. For example, an ink described herein can have any freezing point, melting point, and/or other phase transition temperature not inconsistent with the objectives of the present disclosure. In some cases, an ink has freezing and melting points consistent with temperatures used in some 3D printing systems, including 3D printing systems designed for use with phase changing inks. In some embodiments, the freezing point of an ink is greater than about 40° C. In some instances, for example, an ink has a freezing point centered at a temperature ranging from about 45° C. to about 55° C. or from about 50° C. to about 80° C. In some cases, an ink has a freezing point below about 40° C. or below about 30° C.

Further, in some embodiments described herein, an ink exhibits a sharp freezing point or other phase transition. In some cases, for instance, an ink freezes over a narrow range of temperatures, such as a range of about 1-10° C., about 1-8° C., or about 1-5° C. In some embodiments, an ink having a sharp freezing point freezes over a temperature range of X±2.5° C., where X is the temperature at which the freezing point is centered (e.g., X=65° C.).

In addition, an ink described herein, in some cases, is fluid at jetting temperatures encountered in some 3D printing systems. Moreover, in some embodiments, an ink solidifies once deposited on a surface during the fabrication of a three-dimensionally printed article or object. Alternatively, in other instances, an ink remains substantially fluid upon deposition on a surface. Solidification of an ink, in some embodiments, occurs through a phase change of the ink or a component of the ink. The phase change can comprise a liquid to solid phase change or a liquid to semi-solid phase change. Further, in some instances, solidification of an ink comprises an increase in viscosity of the ink, such as an increase in viscosity from a low viscosity state to a high viscosity state. Solidification of an ink can also occur due to curing of the ink.

Additionally, in some embodiments, an ink described herein, when non-cured, has a viscosity profile consistent with the requirements and parameters of one or more 3D printing systems, such as a multi-jet modeling or stereolithography system. In some cases, for example, an ink described herein has a dynamic viscosity ranging from about 8.0 cP to about 14.0 cP or from about 9.0 to about 14.0 cP at a jetting temperature of the system, such as a temperature of about 80° C., when measured according to ASTM standard D2983 (e.g., using a Brookfield Model DV-II+ Viscometer). In some embodiments, an ink has a dynamic viscosity of about 9.5-12.5 cP or about 10.5-12.5 cP at a temperature of about 80° C. In some cases, an ink has a viscosity of about 8.0-10.0 cP at a temperature of about 85-87° C. In some embodiments, an ink described herein has a dynamic viscosity of about 8.0-19.0 cP, about 8.0-13.5 cP, about 11.0-14.0 cP, about 11.5-13.5 cP, or about 12.0-13.0 cP at a temperature of about 65° C., when measured according to ASTM D2983. In other instances, an ink described herein when non-cured exhibits a dynamic viscosity of about 200-2000 cP, about 200-900 cP, about 300-900 cP, about 300-800 cP, about 400-1000 cP, about 400-900 cP, about 400-800 cP, about 400-600 cP, about 450-550 cP, about 500-700 cP, about 500-600 cP, or about 500-550 cP at 30° C., when measured according to ASTM D2983. In some cases, an ink described herein when non-cured exhibits a dynamic viscosity of less than about 100 cP or more than about 1000 cP, when measured according to ASTM D2983.

Further, inks described herein, in some embodiments, can exhibit a combination of one or more desirable features. In some cases, for instance, an ink in the non-cured state has one or more of the following properties:

1. Freezing point below about 30° C., below about 25° C., or below about 15° C.;
2. Viscosity of about 9-14 cP at 70-95° C. or about 400-1000 cP at 25-35° C.; and
3. Thermal stability for at least 6 months at room temperature (25° C.).

As described above, viscosity can be measured according to ASTM D2983 (e.g., using a Brookfield Model DV-II+ Viscometer). In addition, for reference purposes herein, a "thermally stable" material exhibits no greater than about a 35 percent change in viscosity over a specified time period (e.g., 3 days) when measured at the specified temperature (e.g., room temperature) at the beginning and at the end of the time period. In some embodiments, the viscosity change is no greater than about 30 percent or no greater than about 20 percent, based on the larger viscosity value. In some cases, the viscosity change is between about 10 percent and about 20 percent or between about 25 percent and about 30 percent. Moreover, in some embodiments, the change in viscosity is an increase in viscosity.

Inks described herein can also exhibit a variety of desirable properties, in addition to those described hereinabove in a cured state or in a "green" state. An ink in a "cured" state, as used herein, comprises an ink that includes a curable material or polymerizable component that has been at least partially polymerized and/or cross-linked or that has been largely polymerized and/or cross-linked. For instance, in some cases, a cured ink is at least about 51% polymerized or cross-linked or at least about 60% polymerized or cross-linked. In some embodiments, a cured ink is at least about 70%, at least about 80%, at least about 90%, or at least about 95% polymerized or cross-linked. In some instances, a cured ink is between about 50% and about 99% polymerized or cross-linked. An ink in a "green" state can be less than 50%, less than 40%, less than 30%, or less than 20% polymerized or cross-linked. In some cases, an ink in a green state is 5-50%, 5-40%, 5-30%, 10-50%, 10-40%, 10-30%, 20-50%, 20-40%, 30-50%, or 30-40% polymerized or cross-linked. Moreover, as understood by one of ordinary skill in the art, a "green" state of an ink can be defined as the state of the ink during or after a layer-by-layer 3D printing process described herein but before a post-processing curing step has been performed.

In some cases, an ink described herein, when cured or in a green state, has an elongation at break of about 10-400%, 10-300%, 10-200%, 10-100%, 10-8-%, 10-40%, 10-30%, 10-20%, 15-400%, 15-300%, 15-100%, 15-30%, 50-400%, 50-300%, 50-200%, 50-100%, 100-400%, 100-300%, 100-200%, 200-400, 200-300%, or 300-400%, when measured according to ASTM D638. Further, a cured or green ink described herein, in some cases, can have a tensile strength of about 3500-7000 psi or about 4000-6000 psi, when measured according to ASTM D638. Additionally, a cured or green ink described herein, in some embodiments, can have a tensile modulus of about 100-400 ksi or about 150-300 ksi, when measured according to ASTM D638.

Moreover, in some cases, an ink described herein, when cured, can exhibit a plurality of the foregoing properties. For example, in some embodiments, an ink when cured has a tensile strength of about 4000-6000 psi when measured according to ASTM D638; a tensile modulus of about 150-300 ksi when measured according to ASTM D638; and an elongation at break of about 10-400% when measured according to ASTM D638.

Inks described herein can be produced in any manner not inconsistent with the objectives of the present disclosure. In some embodiments, for instance, a method for the preparation of an ink described herein comprises the steps of mixing the components of the ink, melting the mixture, and filtering the molten mixture. Melting the mixture, in some cases, is carried out at a temperature of about 75° C. or in a range from about 75° C. to about 85° C. In some embodiments, an ink described herein is produced by placing all components of the ink in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting or extrusion or other printing process. The filtered mixture can then be cooled to ambient temperatures and stored until ready for use in a 3D printing system. In other instances, the components of an ink are mixed at ambient temperature (e.g., 20-25° C.), without heating, or with minimal heating (e.g., to a temperature of 30-45° C.). Such a method can still include filtering the resulting liquid mixture.

II. Uses of Compositions for 3D Printing

In another aspect, uses of a composition for 3D printing are described herein, wherein the composition comprises an ink or kit described hereinabove. For instance, in some cases, a use of a composition for 3D printing is described herein, wherein the composition comprises an ink comprising a thiol monomer and an ene monomer. However, any ink or plurality of inks described hereinabove in Section I may be used for 3D printing.

III. 3D Printing Systems

In still another aspect, 3D printing systems are described herein. Such a 3D printing system can use or comprise a composition for 3D printing described hereinabove, such as a composition comprising an ink, plurality of inks, or kit described hereinabove. In some embodiments, a 3D printing system described herein comprises a 3D printer having at least one of an ink dispenser and an ink reservoir, and an ink described herein disposed in the ink dispenser, the ink reservoir, or both. The ink comprises, consists of, or consists essentially of any ink described hereinabove in Section I. Additionally, in some cases, a 3D printing system described herein comprises a 3D printer having a first ink dispenser and a second ink dispenser, a first ink disposed in the first ink dispenser, and a second ink disposed in the second ink dispenser. The first ink and the second ink each comprise, consist of, or consist essentially of a first ink and a second ink described hereinabove in Section I.

In general, any 3D printer not inconsistent with the objectives of the present disclosure may contain or include an ink described herein, including in an ink dispenser and/or reservoir. In some embodiments, for example, the 3D printer comprises an inkjet or so-called multi-jet modeling (MJM) type 3D printer. In other instances, the 3D printer comprises a stereolithography (SLA) type 3D printer, a digital light processing (DLP) type 3D printer, or a contacted SLA (cSLA) type printer. Other 3D printers may also be used.

IV. Methods of Printing a 3D Article

In another aspect, methods of printing a 3D article or object are described herein. Methods of printing a 3D article or object described herein can include forming the 3D article from a plurality of layers of an ink described herein in a layer-by-layer manner. Any ink described hereinabove in Section I may be used. For example, in some cases, the ink comprises a thiol monomer and an ene monomer. Other inks described herein may also be used. Moreover, in some cases, a method described herein comprises selectively depositing layers of the ink in a fluid state onto a substrate.

Additionally, a method described herein can further comprise curing or polymerizing one or more monomers or curable materials of the ink, such as the thiol monomer and the ene monomer of the ink. Moreover, when an ink comprises a plurality of monomers having differing polymerization processes or curing mechanisms, the differing monomers can be cured or polymerized in separate curing or polymerization steps carried out at different time periods and/or in different spatial regions of a layer of ink. Further, differing monomers can be cured or polymerized in different manners.

For instance, in some cases, an ink used in a method described herein comprises a thiol monomer, an ene monomer, and an additional (meth)acrylate monomer differing from the ene monomer. In some such instances, a method described herein comprises curing or polymerizing the ethylenically unsaturated moieties of the (meth)acrylate monomer to form a poly(meth)acrylate. For example, the (meth)acrylate monomer can be cured or polymerized with UV light. Further, in some embodiments, the method further comprises separately curing or polymerizing the thiol monomer and the ene monomer. Such curing or polymerizing can comprise reacting the thiol monomer with the ene monomer to form a poly(thiol-ene). Moreover, reaction of the thiol monomer with the ene monomer, in some cases, is thermally initiated. In other embodiments, reaction of the thiol monomer with the ene monomer is photoinitiated. However, in some such cases, photocuring the additional (meth)acrylate monomer is carried out using a different wavelength or intensity of light, compared to photocuring the thiol monomer and the ene monomer. It is also possible to initiate reaction of the thiol monomer with the ene monomer using the same light used to initiate polymerization of the additional (meth)acrylate monomer. Additionally, in some instances, thermal energy released by the photoinitiated polymerization of the (meth)acrylate monomer is used to initiate reaction of the thiol monomer with the ene monomer.

Curing or polymerizing one or more curable materials or monomers described herein can be carried out in any manner not inconsistent with the objectives of the present disclosure. For example, in some instances, a layer of deposited ink can be polymerized or cured prior to the deposition of another or adjacent layer of ink. Thus, in some cases, a method of printing a 3D article described herein further comprises exposing a layer of ink to electromagnetic radiation of sufficient wavelength and intensity to cure at least one monomer (or pair of monomers) of the ink, where curing can comprise polymerizing one or more polymerizable moieties or functional groups of one or more components of the monomer (or pair of monomers). In some embodiments, UV light or visible light is used.

Similarly, curing can also be carried out thermally. In some embodiments, as described above, thermal curing is carried out using thermal energy or heat provided by a photocuring step described herein, including thermal energy released by the photoinitiated polymerization of a (meth)acrylate monomer. Thermal curing can also be carried out by heating the ink (or an article formed from the ink) using a source of thermal energy such as an oven. Thermal curing may be carried out during layer-by-layer printing, or after layer-by-layer printing of the article. For example, in some cases, an article is heated in a "post-processing" step, such as by placing the previously formed article in an oven or other space at an elevated temperature. In some such instances, the article can be heated at a temperature and for a time period sufficient to cure a previously uncured monomer of an ink from which the article is formed, as opposed to being heated at a lower temperature and/or for a shorter time period, such as may be used to melt a support material off or away from a completed 3D article. However, in some instances, a support material, if present, may be melted off a completed 3D article at the same time as thermal curing of a monomer of the ink.

As described above, a method of printing a 3D article described herein can comprise forming the 3D article from a plurality of layers of a plurality of inks described herein in a layer-by-layer manner, rather than from a single ink. For instance, in some embodiments, a method comprises forming the 3D article from a plurality of layers of a first ink and a plurality of layers of a second ink. In some such cases, a method of printing a 3D article comprises selectively depositing layers of a first ink in a fluid state onto a substrate and selectively depositing layers of a second ink in a fluid state onto the substrate, wherein the first ink and the second ink respectively comprise a first ink and a second ink described hereinabove in Section I. For example, the first ink can comprise a thiol monomer and the second ink can comprise an ene monomer.

As with "single" inks, methods described herein using a plurality of differing inks can also comprise curing a plurality of monomers or curable materials of the inks, including in separate curing steps carried out at different time periods and/or in different spatial regions of a layer of one or more inks. Moreover, as described further herein, different monomers or curable materials can be cured in different manners. For example, in some embodiments, the second ink comprises an additional (meth)acrylate monomer, and the method further comprises curing the additional (meth) acrylate monomer of the second ink with UV light and subsequently thermally curing or photocuring the thiol monomer and the ene monomer.

In general, the layers of an ink or plurality of inks can be deposited according to an image of the 3D article in a computer readable format. In some embodiments, an ink is deposited according to preselected computer aided design (CAD) parameters. Moreover, in some cases, one or more layers of an ink described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include so-called multi-jet modeling or stereolithography 3D printing methods. For example, in some instances, a multi-jet method of printing a 3D article comprises selectively depositing layers of one or more inks described herein in a fluid state onto a substrate, such as a build pad of a 3D printing system. In addition, in some embodiments, a method described herein further comprises supporting at least one of the layers of the one or more inks with a support material. Any support material not inconsistent with the objectives of the present disclosure may be used.

Further, in some embodiments, a preselected amount of ink described herein is heated to the appropriate temperature and jetted through the print head or a plurality of print heads of a suitable inkjet printer to form a layer on a print pad in a print chamber. In some cases, each layer of ink is deposited according to the preselected CAD parameters. A suitable print head to deposit the ink, in some embodiments, is a piezoelectric print head. Additional suitable print heads for the deposition of ink and support material described herein are commercially available from a variety of ink jet printing apparatus manufacturers. For example, Xerox, Hewlett Packard, or Ricoh print heads may be used in some instances.

Additionally, in some embodiments, an ink described herein remains substantially fluid upon deposition. Alternatively, in other instances, the ink exhibits a phase change upon deposition and/or solidifies upon deposition. Moreover, in some cases, the temperature of the printing environment can be controlled so that the jetted droplets of ink solidify on contact with the receiving surface. In other embodiments, the jetted droplets of ink do not solidify on contact with the receiving surface, remaining in a substantially fluid state. Additionally, in some instances, after each layer is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some cases, the wiper device comprises a roller and a wiper that removes excess material from the roller. Further, in some instances, the wiper device is heated. It should be noted that the consistency of the jetted ink described herein prior to curing, in some embodiments, should desirably be sufficient to retain its shape and not be subject to excessive viscous drag from the planarizer.

Moreover, a support material, when used, can be deposited in a manner consistent with that described hereinabove for the ink. The support material, for example, can be deposited according to the preselected CAD parameters such that the support material is adjacent or continuous with one or more layers of the ink. Jetted droplets of the support material, in some embodiments, solidify or freeze on contact with the receiving surface. In some cases, the deposited support material is also subjected to planarization.

Layered deposition of the ink and support material can be repeated until the 3D article has been formed. In some embodiments, a method of printing a 3D article further comprises removing the support material from the ink.

It is also possible to form a 3D article from an ink described herein using stereolithography (SLA), contacted SLA (cSLA), or digital light processing (DLP) 3D printing. For example, in some cases, a method of printing a 3D article comprises retaining one or more inks described herein in a fluid state in a container and selectively applying energy to the one or more inks in the container to solidify at least a portion of a fluid layer of the ink, thereby forming a solidified layer that defines a cross-section of the 3D article. Additionally, a method described herein can further comprise raising or lowering the solidified layer of ink to provide a new or second fluid layer of unsolidified ink at the surface of the fluid ink in the container, followed by again selectively applying energy to the ink in the container to solidify at least a portion of the new or second fluid layer of the ink to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the ink. Moreover, selectively applying energy to the ink in the container can comprise applying electromagnetic radiation, such as UV radiation or visible radiation, having a sufficient energy to cure the ink. In some instances, the UV light has an average wavelength of 320-380 nm, 340-370 nm, or 350-360 nm. In some cases, the curing radiation is provided by a computer controlled laser beam or a DLP light source or projector. In addition, in some instances, raising or lowering a solidified layer of ink is carried out using an elevator platform disposed in the container of fluid ink. A method described herein can also comprise planarizing a new layer of fluid ink provided by raising or lowering an elevator platform. Such planarization can be carried out, in some cases, by a wiper or roller.

It is further to be understood that the foregoing process can be repeated a desired number of times to provide the 3D article. For example, in some cases, this process can be repeated "n" number of times, wherein n can be up to about 100,000, up to about 50,000, up to about 10,000, up to about 5000, up to about 1000, or up to about 500. Thus, in some embodiments, a method of printing a 3D article described herein can comprise selectively applying energy to an ink in a container to solidify at least a portion of an nth fluid layer of the ink, thereby forming an nth solidified layer that defines an nth cross-section of the 3D article, raising or lowering the nth solidified layer of ink to provide an (n+1)th layer of unsolidified ink at the surface of the fluid ink in the container, selectively applying energy to the (n+1)th layer of ink in the container to solidify at least a portion of the (n+1)th layer of the ink to form an (n+1)th solidified layer that defines an (n+1)th cross-section of the 3D article, raising or lowering the (n+1)th solidified layer of ink to provide an (n+2)th layer of unsolidified ink at the surface of the fluid ink in the container, and continuing to repeat the foregoing steps to form the 3D article. Further, it is to be understood that one or more steps of a method described herein, such as a step of selectively applying energy to a layer of ink, can be carried out according to an image of the 3D article in a computer-readable format. General methods of 3D printing using stereolithography are further described, inter alia, in U.S. Pat. Nos. 5,904,889 and 6,558,606.

Performing a printing process described above can provide a printed 3D article from an ink described herein that has a high feature resolution. The "feature resolution" of an article, for reference purposes herein, can be the smallest controllable physical feature size of the article. The feature resolution of an article can be described in terms of a unit of distance such as microns (μm), or in terms of dots per inch (dpi). As understood by one of ordinary skill in the art, a higher feature resolution corresponds to a higher dpi value but a lower distance value in μm. In some cases, an article formed by depositing or solidifying an ink described herein can have a feature resolution of about 500 μm or less, about 200 μm or less, about 100 μm or less, or about 50 μm or less, including at elevated temperatures. In some embodiments, an article has a feature resolution between about 50 μm and about 500 μm, between about 50 μm and about 200 μm, between about 50 μm and about 100 μm, or between about 100 μm and about 200 μm. Correspondingly, in some instances, an article described herein has a feature resolution of at least about 100 dpi, at least about 200 dpi, at least about 250 dpi, at least about 400 dpi, or at least about 500 dpi. In some cases, the feature resolution of an article is between about 100 dpi and about 600 dpi, between about 100 dpi and about 250 dpi, or between about 200 dpi and about 600 dpi.

V. Printed 3D Articles

In another aspect, printed 3D articles are described herein. In some embodiments, a printed 3D article is formed from one or more inks described herein. Any ink described hereinabove in Section I may be used. For example, in some cases, the 3D article is formed from a single ink described herein, such as an ink comprising a thiol monomer, an ene monomer, and an additional (meth)acrylate monomer differing from the ene monomer. Moreover, the thiol monomer and the ene monomer, when cured, can together form a poly(thiol-ene). Similarly, the additional (meth)acrylate monomer, when cured, can form a poly(meth)acrylate. In some such cases, the poly(thiol-ene) and the poly(meth) acrylate together form an interpenetrating polymer network.

A printed 3D article described herein may also be formed from a plurality of differing inks. For instance, in some embodiments, a printed 3D article is formed from a first ink and a second ink described hereinabove in Section I. In some such cases, the first ink comprises a thiol monomer and the second ink comprises an ene monomer. The first and/or second ink may also comprise an additional (meth)acrylate monomer that differs from the ene monomer. Additionally, as described hereinabove, such an additional (meth)acrylate monomer of a first or second ink can form a polymer network (specifically, a poly(meth)acrylate network) that differs from the polymer network (specifically, the poly (thiol-ene)) formed by the thiol and ene monomers. Additionally, in some instances, the two polymer networks together form an interpenetrating polymer network.

Some embodiments described herein are further illustrated in the following non-limiting example.

Example

Ink for 3D Printing

An ink according to one embodiment described herein was prepared as follows. First, 15-25 wt. % pentaerythritol tetra(3-mercaptopropionate) (PETMP), 10-50 wt. % oligomeric (meth)acrylate, and 20-50 wt. % monomeric (meth) acrylate, 1-4 wt. % photoinitiator, and 0.1-1 wt. % polymerization inhibitor were mixed and provided in a liquid state in a manner described hereinabove in Section I. Specifically, the individual components of the ink were combined and mixed. The mixture was heated to a temperature of about 60-75° C. with stirring. The heating and stirring were continued until the mixture attained a substantially homogenized liquid state. The liquid mixture was then filtered to remove particulates.

Following preparation of the ink, the ink was used to form various 3D articles using a cSLA 3D printing system. The resulting articles were very tough, flexible, and unbreakable under all conditions tested.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. An ink for use in a three-dimensional printing system comprising:
   up to 30 wt. % thiol monomer, the thiol monomer comprising a secondary thiol monomer; and
   up to 90 wt. % of at least one of an ene monomer and an ene oligomer, based on the total weight of the ink,
   wherein the thiol monomer is present in at least a detectable amount.

2. The ink of claim 1, further comprising 0.1-5 wt. % photoinitiator, based on the total weight of the ink.

3. The ink of claim 1, wherein the thiol monomer comprises pentaerythritol tetrakis(3-mercaptobutylate).

4. The ink of claim 1, wherein the thiol monomer comprises a plurality of differing thiol-containing species.

5. The ink of claim 1, further comprising a (meth)acrylate monomer that differs from the at least one of an ene monomer and an ene oligomer.

6. The ink of claim 1, comprising up to 20 wt. % thiol monomer.

7. The ink of claim 1, further comprising an inhibitor and/or a stabilizing agent.

8. A kit for use in a three-dimensional printing system, the kit comprising:
   a first ink comprising up to 30 wt. % thiol monomer, the thiol monomer comprising pentaerythritol tetrakis(3-mercaptobutylate); and
   a second ink comprising at least one of an ene monomer and an ene oligomer, the ene monomer or ene oligomer comprising a ethylenically unsaturated moiety; wherein the thiol monomer and the ene monomer are not combined prior to printing.

9. The kit of claim 8, wherein the second ink comprises a (meth)acrylate monomer that differs from the at least one ene monomer and ene oligomer.

10. The kit of claim 8, wherein the first ink comprises a plurality of differing thiol-containing species.

11. The kit of claim 8, wherein at least one of the first ink and the second ink comprise 0.1-5 wt. % photoinitiator, based on the total weight of the first ink and the second ink.

12. The kit of claim 8, wherein at least one of the first ink and the second ink comprise an inhibitor and/or a stabilizing agent.

13. The kit of claim 8, wherein the first ink comprises a plurality of thiol moieties.

14. A printed three-dimensional article formed from the ink of claim 1.

15. A method of printing a three-dimensional article comprising:
   Selectively depositing layers of an ink in a fluid state onto a substrate, wherein the ink comprises the ink of claim 1.

16. The method of claim 15, wherein the layers are deposited according to an image of the three-dimensional article in a computer readable format.

17. The method of claim 15, wherein the ink comprises a (meth)acrylate monomer differing from the at least one ene monomer and ene oligomer, and the method comprises further UV curing the (meth)acrylate monomer.

18. The method of claim 15, wherein the thiol monomer comprises pentaerythritol tetrakis(3-mercaptobutylate).

19. The method of claim 15, further comprising thermally curing the thiol monomer and the at least one ene monomer and ene oligomer.

* * * * *